United States Patent
Jiang

(10) Patent No.: US 11,184,515 B2
(45) Date of Patent: Nov. 23, 2021

(54) SCREEN MODULE AND ELECTRONIC DEVICE

(71) Applicant: Beijing Xiaomi Mobile Software Co., Ltd., Beijing (CN)

(72) Inventor: Juanjuan Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/819,780

(22) Filed: Mar. 16, 2020

(65) Prior Publication Data

US 2021/0127043 A1 Apr. 29, 2021

(30) Foreign Application Priority Data

Oct. 29, 2019 (CN) .......................... 201911038889.1

(51) Int. Cl.
*H04N 5/225* (2006.01)
*H04M 1/02* (2006.01)

(52) U.S. Cl.
CPC ........ *H04N 5/2257* (2013.01); *H04M 1/0264* (2013.01); *H04M 1/0266* (2013.01); *H04N 5/2254* (2013.01)

(58) Field of Classification Search
CPC . H04N 5/2257; H04N 5/2254; H04M 1/0264; H04M 1/0266
See application file for complete search history.

(56) References Cited

U.S. PATENT DOCUMENTS

| | | | |
|---|---|---|---|
| 9,591,111 B1 | 3/2017 | Holmes et al. | |
| 9,864,400 B2 | 1/2018 | Evans, V et al. | |
| 10,334,148 B2 | 6/2019 | Kwak et al. | |
| 2012/0218312 A1* | 8/2012 | Goldsmith | G09G 3/344 345/690 |
| 2014/0184521 A1* | 7/2014 | Kwong | G03B 17/12 345/173 |
| 2015/0185767 A1 | 7/2015 | S. | |
| 2017/0123452 A1 | 5/2017 | Evans, V et al. | |

(Continued)

FOREIGN PATENT DOCUMENTS

| | | |
|---|---|---|
| CN | 106918964 A | 7/2017 |
| CN | 107068716 A | 8/2017 |

(Continued)

OTHER PUBLICATIONS

Supplementary European Search Report in European Application No. 20166114.7, dated Oct. 9, 2020.

(Continued)

*Primary Examiner* — Mekonnen D Dagnew

(74) *Attorney, Agent, or Firm* — Finnegan, Henderson, Farabow, Garrett & Dunner, L.L.P.

(57) ABSTRACT

A screen includes: a camera component and a display component. The camera component includes a lens portion and an image processor. The lens portion is integrated in the display component. The image processor is assembled below the display component and is disposed at a position corresponding to the lens portion. The display component includes at least one light-transmitting layer. The at least one light-transmitting layer has a predetermined region corresponding to the image processor. The lens portion includes at least one lens. The lens is disposed in the predetermined region.

18 Claims, 4 Drawing Sheets

(56) References Cited

U.S. PATENT DOCUMENTS

| | | |
|---|---|---|
| 2017/0187934 A1 | 6/2017 | Kwak et al. |
| 2018/0107241 A1 | 4/2018 | Evans, V et al. |
| 2019/0253591 A1 | 8/2019 | Chen et al. |
| 2019/0260919 A1 | 8/2019 | Kwak et al. |
| 2019/0302833 A1 | 10/2019 | Cheng |

FOREIGN PATENT DOCUMENTS

| | | |
|---|---|---|
| CN | 108196388 A | 6/2018 |
| CN | 108476276 A | 8/2018 |
| CN | 108957819 A | 12/2018 |
| CN | 110071150 A | 7/2019 |
| JP | 2014-103458 A | 6/2014 |
| KR | 20170077360 A | 7/2017 |
| KR | 20180033701 A | 4/2018 |
| KR | 20190006689 A | 1/2019 |

OTHER PUBLICATIONS

Notification of Reason for Refusal dated Jul. 14, 2021, from the Korean Intellectual Property Office in counterpart Korean Application No. 10-2020-7007768.

\* cited by examiner

SCREEN MODULE AND ELECTRONIC DEVICE

CROSS-REFERENCE TO RELATED APPLICATIONS

This application is based upon and claims priority to Chinese Patent Application No. 201911038889.1, filed on Oct. 29, 2019, the content of which is hereby incorporated by reference in its entirety.

TECHNICAL FIELD

The disclosure relates to the technical field of electronic technologies, and more particularly to a screen module and an electronic device.

BACKGROUND

In the related art, an electronic device, such as a mobile phone, usually includes a front camera assembled on the electronic device, to implement a front shooting function. With the increasing user demands for screen display, the front camera occupying a display region of a screen of the electronic device, reduces a screen display ratio and affects the lightness and thinness properties of the device. Therefore, how to reduce the effect of the front camera to the screen display ratio of the electronic device, avoid the formation of screen structure such as "front hair-shaped" screen and "drop-shaped" screen, and optimize structural settings of the electronic device have become a hot issue in the current field of research.

SUMMARY

A screen and an electronic device are provided in the present disclosure, so as to reduce the effect of a front camera to a screen display ratio of an electronic device and improve the lightness and thinness of the electronic device.

According to a first aspect of the disclosure, a screen includes a camera component and a display component. The camera component includes a lens portion and an image processor. The lens portion is integrated in the display component. The image processor is assembled below the display component and is disposed at a position corresponding to the lens portion. The display component includes at least one light-transmitting layer. The at least one light-transmitting layer has a predetermined region corresponding to the image processor. The lens portion includes at least one lens. The lens is disposed in the predetermined region.

According to a second aspect of the disclosure, an electronic device includes a device body and a screen. The screen is assembled in the device body, and includes a camera component and a display component. The camera component includes a lens portion and an image processor. The lens portion is integrated in the display component. The image processor is assembled below the display component and is disposed at a position corresponding to the lens portion. The display component includes at least one light-transmitting layer. The at least one light-transmitting layer has a predetermined region corresponding to the image processor. The lens processor may include at least one lens. The lens is disposed in the predetermined region.

It is to be understood that the above general description and following detailed description are only exemplary and explanatory, rather than limiting the disclosure.

BRIEF DESCRIPTION OF THE DRAWINGS

The accompanying drawings, which are incorporated in and constitute a part of this specification, illustrate embodiments consistent with the disclosure and along with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise stated. The implementations set forth in the following description of exemplary embodiments do not represent all implementations consistent with the present disclosure. Instead, the disclosed implementations are provided merely as examples of apparatuses and methods consistent with aspects related to the present disclosure and as recited in the appended claims.

Figure 1:
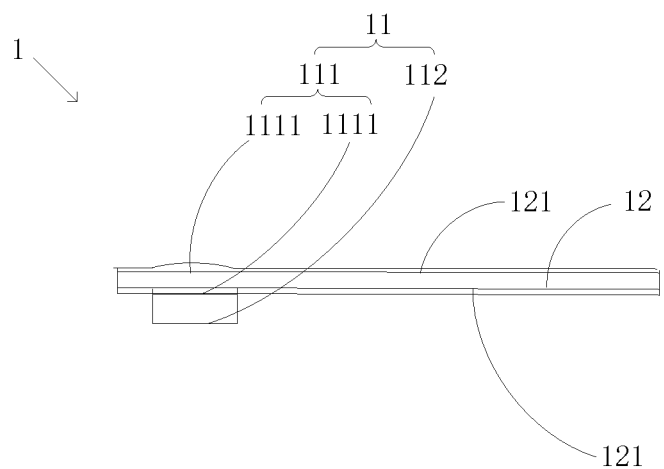
FIG. 1 is a schematic cross-sectional structural diagram of a screen module according to an exemplary embodiment of the disclosure.

FIG. 1 is a schematic cross-sectional structural diagram of a screen for an electronic device, such as a screen module 1, according to an exemplary embodiment of the disclosure. As shown in FIG. 1, the screen module 1 includes a camera component 11 and a display component 12. The camera component 11 includes a lens portion such as a lens module 111, and an image processor such as an image processing module 112. The lens module 111 is integrated in the display component 12. The image processing module 112 is assembled below the display component 12, and is disposed at a position corresponding to the lens module 111. The display component 12 includes at least one light-transmitting layer 121. The at least one light-transmitting layer 121 has a predetermined region corresponding to the image processing module 112. The lens module 111 includes at least one lens 1111. The lens 1111 is disposed in the predetermined region.

The image processing module 112 can perform photosensitive analysis and processing on light passing through the lens 1111, and then generate an image corresponding to a shooting scene.

The lens module 111 of the camera component 11 is integrated in the display component 12, an external assembly and fixing structure such as a lens barrel of the lens module 111 is removed, and the lens 1111 of the lens module 111 is directly disposed in the predetermined region of the light-transmitting layer 121 of the display component 12. In this way, the lens 1111 of the lens module 111 is distributed in the light-transmitting layer 121 without occupying other spaces of the display component 12. With the aforementioned structure setting, the entire lens module is disassembled and simplified, so as to avoid an increase in the structural size and occupying assembly space due to the assembly of the integrated lens module 111, thereby reducing the occupation and effect of the lens module 111 to an internal space of the display component 12, and facilitating full-screen display of the electronic device, while improving the lightness and thinness of the entire electronic device.

It is to be noted that the display component 12 may be an Organic Light-Emitting Diode (OLED) screen, a Liquid Crystal Display (LCD) screen or the like, which is not limited in the disclosure. With taking an OLED screen as an example of the display component 12, as further illustrated in FIGS. 2-4, the light-transmitting layer 121 of the OLED screen includes a cover plate 1211 at a top layer of the screen, a first substrate 1212 at a bottom layer of the screen, and a second substrate 1213 at an intermediate layer of the screen. In a case that the lens module 111 includes one lens 1111, the lens may be disposed on one of the cover plate 1211, the first substrate 1212, and the second substrate 1213 of the display component 12. In a case that the lens module 111 includes multiple lenses 1111, the lenses may be correspondingly disposed on ones of the cover plate 1211, the first substrate 1212, and the second substrate 1213 of the display component 12, as long as a light refraction requirement of the camera component 11 on the lens module 111 is met, which is not limited in the disclosure.

The arrangement mode of the lens module 111 and the structure of the electronic device are illustrated below.

Figure 2:
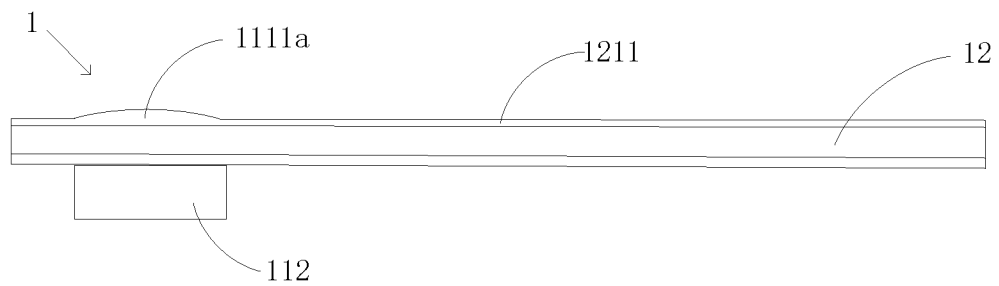
FIG. 2 is a schematic cross-sectional structural diagram of a screen module according to an exemplary embodiment of the disclosure.

In an embodiment, as shown in FIG. 2, the display component 12 includes a cover plate 1211 at a top layer of the display component 12. The light-transmitting layer 121 of the display component 12 is a cover plate 1211 at a top layer of the display component 12. The lens module 111 includes a first lens 1111a. The first lens 1111a is disposed in a predetermined region of the cover plate 1211, so that light in a scene to be shot enters the image processing module 112 after being refracted by the first lens 1111a, thereby realizing a scene shooting function. The cover plate 1211 is located at the top layer of the display component 12 and has no shielding structure on an upper layer thereof, so that a shooting angle of the first lens 1111a disposed on the cover plate 1211 is enlarged, which improves a shooting effect of the camera component 11. In addition, the arrangement of the first lens 1111a on the cover plate 1211 at the top layer of the display component 12 also improves the convenience of machining and assembly of the first lens 1111a.

Figure 3:
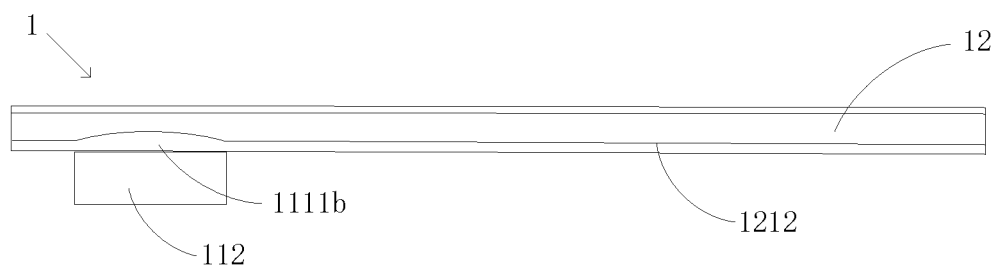
FIG. 3 is a schematic cross-sectional structural diagram of a screen module according to an exemplary embodiment of the disclosure.

In another embodiment, as shown in FIG. 3, the light-transmitting layer 121 of the display component 12 includes a first substrate 1212 at a bottom layer of the display component 12. The lens module 111 includes a second lens 1111b. The second lens 1111b is disposed in a predetermined region of the first substrate 1212, so that light in a scene to be shot enters the image processing module 112 after being refracted by the second lens 1111b, thereby realizing a scene shooting function. The second lens 1111b of the lens module 111 is disposed on the first substrate 1212 at the bottom layer of the display component 12. The structure of the lens 1111 is prevented from affecting the overall appearance of the display component 12, and the machining and assembly operations of the second lens 1111b are also facilitated.

Figure 4:
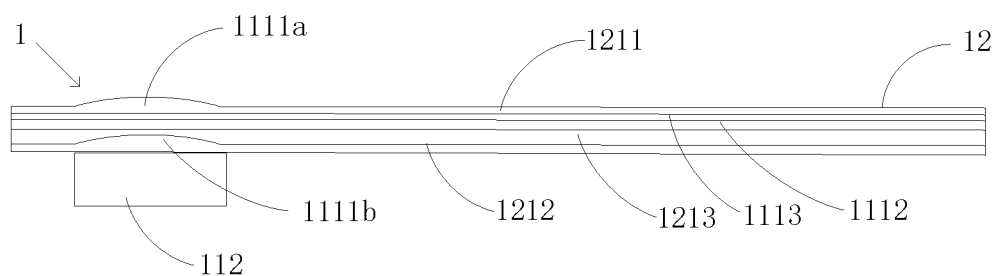
FIG. 4 is a schematic cross-sectional structural diagram of a screen module according to an exemplary embodiment of the disclosure.

In the above embodiments, the lens module 111 may be provided with the first lens 1111a or the second lens 1111b, or may include both the first lens 1111a and the second lens 1111b as shown in FIG. 4, which is not limited in the disclosure. When the lens module 111 is provided with the first lens 1111a or the second lens 1111b, the structural complexity and machining and assembly costs of the lens module 111 can be reduced. When the lens module 111 includes both the first lens 1111a and the second lens 1111b, the first lens 1111a and the second lens 1111b can be used for meeting the light refraction requirements of the camera component 11 for the lens module 111, which reduces the machining and assembly difficulties of the first lens 1111a and the second lens 1111b, and can also improve the light refraction effect and the shooting effect of the lens module 111.

In another embodiment, the light-transmitting layer 121 of the display component 12 includes a second substrate 1213 at an intermediate layer of the display component 12. As shown in FIG. 4, the lens module 111 includes an anti-reflection film layer 1112 and/or a dimming film layer 1113 which are disposed in the predetermined region of the second substrate 1213, thereby improving the light collection effect of the lens module 111. According to different shooting function requirements of the camera component 11 of the electronic device, at least one of the anti-reflection film layer 1112 and the dimming film layer 1113 may be disposed for the lens module 111, to improve the shooting quality of the camera component 11. The anti-reflection film layer 1112 and the dimming film layer 1113 may be directly plated on the predetermined region of the second substrate 1213, or may be provided on the second substrate 1213 by means of adhesion or the like, which is not limited in the disclosure.

In an embodiment, the anti-reflection film layer 1112 and the dimming film layer 1113 may also be disposed on other light-transmitting layer 121 such as the cover plate 1211 and the first substrate 1212 of the display component 12, which is not limited in the disclosure. In addition, other functional film layers may be provided for the lens module 111 to achieve different shooting effects. The functional film layers may also be adhered or plated on the light-transmitting layer 121 of the display component 12.

The arrangement manner of the lens 1111 on the light-transmitting layer 121 is illustrated below.

In an embodiment, as shown in FIG. 4, the predetermined region of the light-transmitting layer 121 is in an integrated light-transmitting structure of the light-transmitting layer 121, and the lens 1111 is formed by the light-transmitting structure. For example, the lens 1111 is formed by performing a machining process such as grinding directly on a part of the light-transmitting structure of the light-transmitting layer 121. After machining is completed, the lens 1111 and the light-transmitting layer 121 are of an integrated structure, which reduces the assembly process of the lens 1111, can also improve an integration effect between the lens 1111 and the display component 12, and reduces an internal space of the display component 12 occupied by the lens module 111.

Figure 5:
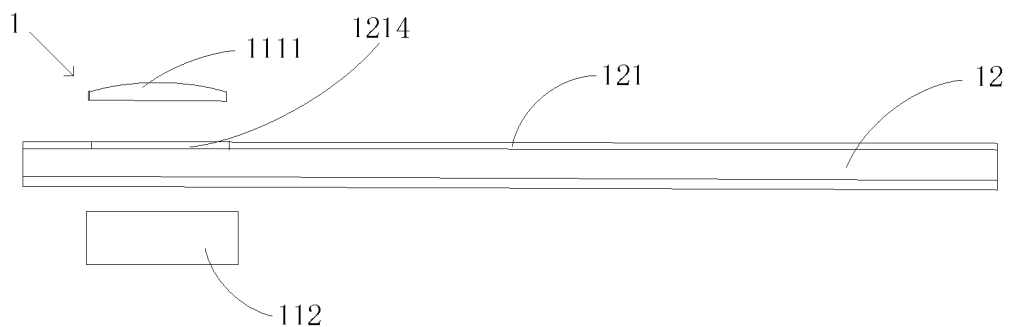
FIG. 5 is a schematic exploded structural diagram of a display component and a camera component according to an exemplary embodiment of the disclosure.

In another embodiment, as shown in FIG. 5, the predetermined region of the light-transmitting layer 121 is in a hollow structure 1214, and the lens 1111 is assembled in the hollow structure 1214. For example, the lens 1111 is a structure independent of the light-transmitting layer 121.

The predetermined region of the light-transmitting layer 121 is set to match the hollow structure 1214 of the lens 1111. The prepared lens 1111 is assembled in the hollow structure 1214 subsequently to achieve a light refraction function. The above structural setting not only facilitates preparing and manufacturing of the lens 1111, but also ensures the light propagation effect and shooting quality of the lens 1111.

It is to be noted that a light-shielding member (not shown) may also be provided for the camera component 11. When the lens 1111 is assembled in a hollow region of the light-transmitting layer 121, the light-shielding member may be disposed around the lens 1111 to prevent external light from affecting the display effect of the display component 12. When the lens 1111 and the light-transmitting layer 121 are integrally formed, a light-shielding member may be disposed around the image processing module 112 below the display component 12 to prevent external light from affecting the display component 12 and other functional components in the electronic device.

In addition, in order to assist the camera component 11 with acquisition of light during the shooting process, a corresponding display structure of the display component 12 may be used.

Figure 6:
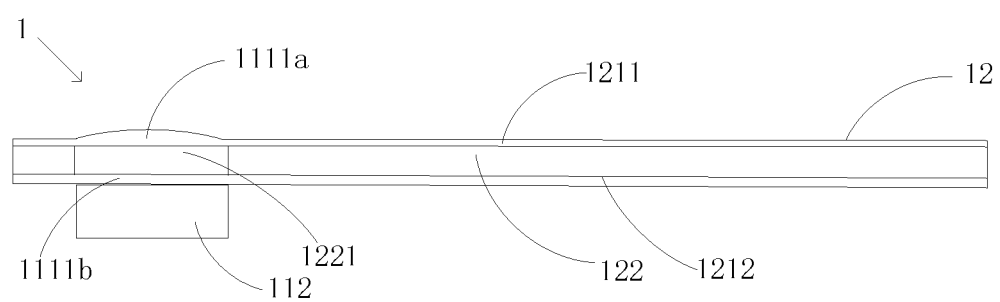
FIG. 6 is a schematic cross-sectional structural diagram of a screen module according to an exemplary embodiment of the disclosure.

In an embodiment, as shown in FIG. 6, the display component 12 further includes a display layer 122. A light-transmitting portion 1221 is disposed at a position of the display layer 122 corresponding to the predetermined region, to allow light to pass through the light-transmitting portion 1221 to reach the image processing module 112. The light-transmitting portion 1221 may be a hollow portion of the display layer 122, or may be made of a light-transmitting material having no display function, so as to avoid blocking or affecting light emitted to the image processing module 112.

Figure 7:
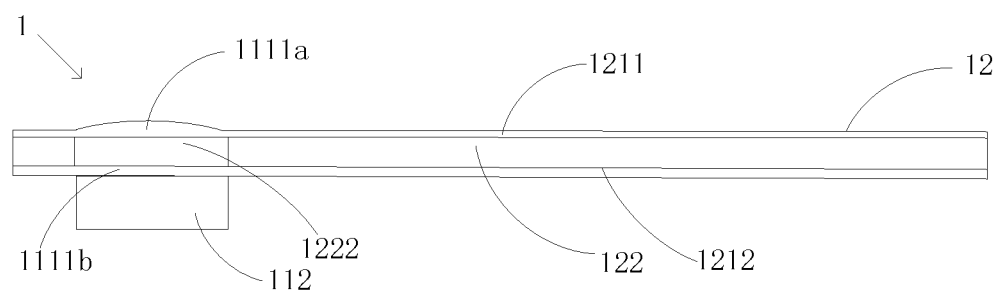
FIG. 7 is a schematic cross-sectional structural diagram of a screen module according to an exemplary embodiment of the disclosure.

In another embodiment, as shown in FIG. 7, the display component 12 further includes a display layer 122. A function display portion 1222 is disposed at a position of the display layer 122 corresponding to the predetermined region, and the function display portion 1222 is controllable to be optionally in a display state and a light-transmitting state. When the function display portion 1222 is in the display state, the display component 12 has a complete display effect. When the function display portion 1222 is in the light-transmitting state, light passes through the function display portion 1222 to reach the image processing module 112. Based on the two operation states of the function display portion 1222 of the display layer 122, the function display portion 1222 is controlled by a motherboard 211 of a device body 21 (FIG. 8) to be in the display state when the camera component 11 is not used, and to be in the light-transmitting state when the camera component 11 is used. The display effect of the display component 12 is ensured, and further the light acquisition of the camera component 11 is also ensured, which improves the function richness of the electronic device.

Figure 8:
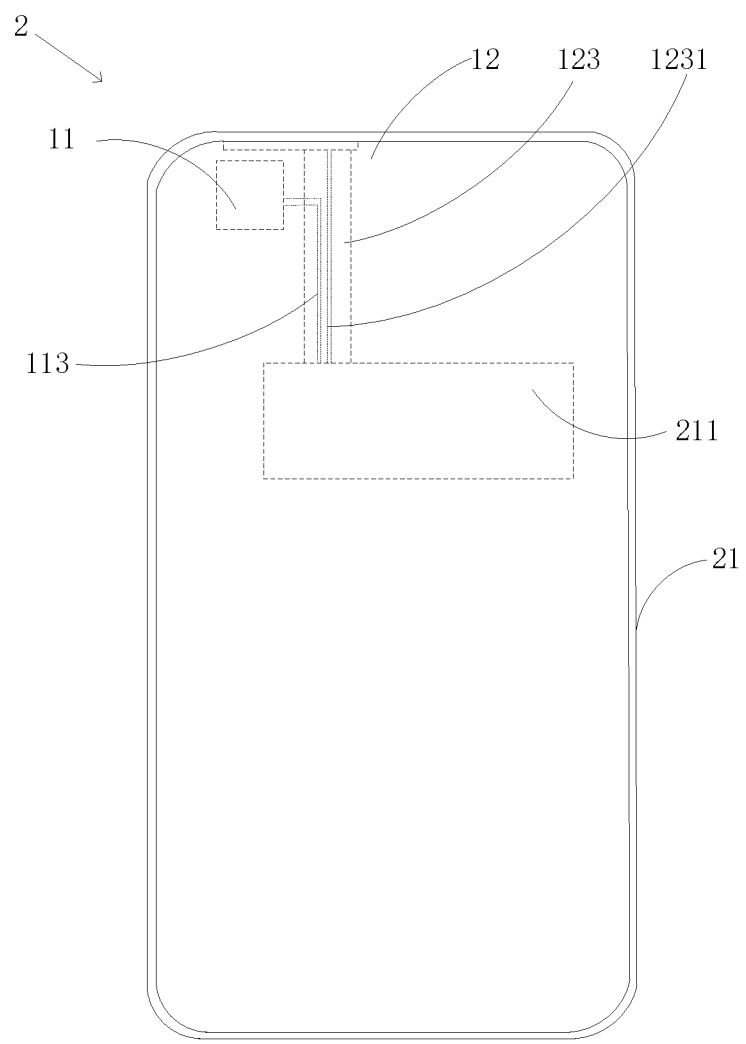
FIG. 8 is a structural perspective view of an electronic device according to an exemplary embodiment of the disclosure.

FIG. 8 is a structural perspective view of an electronic device 2 according to an exemplary embodiment of the disclosure. The electronic device 2 includes a device body 21 and the screen module 1. The screen module 1 is assembled in the device body 21.

As shown in FIG. 8, the display component 12 further includes a circuit board 123. The circuit board 123 includes a screen control circuit 1231 and a camera control circuit 113. The display component 12 is electrically connected to the motherboard 211 of the device body 21 through the screen control circuit 1231. The camera component 11 is electrically connected to the motherboard 211 through the camera control circuit 113. With the arrangement of the camera control circuit 113 on the circuit board 123 of the display component 12, the internal space of the electronic device 2 occupied by the excessive arrangement of the circuit board 123 is reduced, and associated control for the display component 12 and the camera component 11 is facilitated.

In addition, the device body 21 includes at least one screen assembly surface (not shown), and the display component 12 covers the screen assembly surface. For example, in a case that a front surface of the device body 21 is a screen assembly surface, the display component 12 may cover the front surface of the device body 21 to have a full-screen display effect. Also for example, in a case that the front surface of the device body 21 and two side surfaces adjacent to the front surface are screen assembly surfaces, the display component 12 may cover the front surface and the two side surfaces of the device body 21, to have a full-screen display effect. As another example, in a case that the display component 12 covers a part of the screen assembly surface, the lens module 111 of the camera component 11 may also be integrated in the display component 12 in the manner described in the above embodiment, to avoid occupying a non-display region on the screen assembly surface by the camera component 11.

The electronic device 2 may be a mobile phone, a vehicle-mounted terminal, a tablet, a medical terminal, etc., which is not limited in the disclosure.

In some embodiments, the lens module 111 may be a lens component or a lens portion which includes one or more lenses.

In some embodiments, the image processing module 112 may be an image processing circuit and an image processor.

The lens module 111 of the camera component 11 is integrated in the display component 12, an external assembly and fixing structure such as a lens barrel of the lens module 111 is removed, and the lenses 1111 of the lens module 111 is disposed in the predetermined region of the light-transmitting layer 121 of the display component 12. In this way, the lenses 1111 of the lens module 111 is distributed in the corresponding light-transmitting layer 121 without occupying other spaces of the display component 12. With the aforementioned structure setting, the entire lens module 111 is disassembled and simplified, so as to avoid an increase in the structural size and occupying assembly space due to the assembly of an integrated lens module 111, thereby reducing the occupation and effect of the lens module 111 to an internal space of the display component 12, and facilitating the full-screen display of the electronic device 2, while improving the lightness and thinness of the entire electronic device 2.

Other implementations of the present disclosure will be apparent to those skilled in the art from consideration of the specification and practice of the present disclosure. This present application is intended to cover any variations, uses, or adaptations of the present disclosure conforming to the general principles thereof and including such departures from the present disclosure as come within known or customary practice in the art. The specification and embodiments are exemplary, and a true scope and spirit of the present disclosure are indicated by the following claims.

It will be appreciated that the present disclosure is not limited to the exact construction that has been described above and illustrated in the accompanying drawings, and that various modifications and changes may be made without departing from the scope of the present disclosure. It is intended that the scope of the present disclosure is only limited by the appended claims.

What is claimed is:

1. A screen, comprising:
a camera component and a display component, wherein:
the camera component comprises a lens portion and an image processor, the lens portion is integrated in the display component, and the image processor is assembled below the display component and is disposed at a position corresponding to the lens portion; and
the display component comprises at least one light-transmitting layer having a predetermined region corresponding to the image processor, and the lens portion comprises at least one lens disposed in the predetermined region.

2. The screen of claim 1, wherein the display component comprises a cover plate at a top layer of the display component, the at least one light-transmitting layer includes the cover plate, the lens portion comprises a first lens, and the first lens is disposed in the predetermined region of the cover plate.

3. The screen of claim 1, wherein the at least one light-transmitting layer includes a first substrate at a bottom layer of the display component, the lens portion comprises a second lens, and the second lens is disposed in the predetermined region of the first substrate.

4. The screen of claim 1, wherein the at least one light-transmitting layer includes a second substrate at an intermediate layer of the display component, and the lens portion comprises at least one of an anti-reflection film layer or a dimming film layer, disposed in the predetermined region of the second substrate.

5. The screen of claim 1, wherein the predetermined region of the at least one light-transmitting layer is in a hollow structure, and the at least one lens is assembled in the hollow structure.

6. The screen of claim 1, wherein the predetermined region of the at least one light-transmitting layer is in an integrated light-transmitting structure of the at least one light-transmitting layer, and the at least one lens is formed by the light-transmitting structure.

7. The screen of claim 1, wherein the display component further comprises a display layer, and a light-transmitting portion is provided at a position of the display layer corresponding to the predetermined region, to allow light to pass through the light-transmitting portion to reach the image processor.

8. The screen of claim 1, wherein the display component further comprises a display layer, a function display portion is provided at a position of the display layer corresponding to the predetermined region, the function display portion is controllable to be selectively in a display state and a light-transmitting state, wherein when the function display portion is in the display state, the display component has a complete display effect, and when the function display portion is in the light-transmitting state, light passes through the function display portion to reach the image processor.

9. An electronic device, comprising:
a device body and a screen, the screen being assembled in the device body,
wherein the screen comprises a camera component and a display component,
the camera component comprises a lens portion and an image processor, the lens portion is integrated in the display component, and the image processor is assembled below the display component and is disposed at a position corresponding to the lens portion; and
the display component comprises at least one light-transmitting layer having a predetermined region corresponding to the image processor, and the lens portion comprises at least one lens disposed in the predetermined region.

10. The electronic device of claim 9, wherein the display component comprises a cover plate at a top layer of the display component, the at least one light-transmitting layer includes the cover plate, the lens portion comprises a first lens, and the first lens is disposed in the predetermined region of the cover plate.

11. The electronic device of claim 9, wherein the at least one light-transmitting layer includes a first substrate at a bottom layer of the display component, the lens portion comprises a second lens, and the second lens is disposed in the predetermined region of the first substrate.

12. The electronic device of claim 9, wherein the at least one light-transmitting layer includes a second substrate at an intermediate layer of the display component, and the lens portion comprises at least one of an anti-reflection film layer or a dimming film layer, disposed in the predetermined region of the second substrate.

13. The electronic device of claim 9, wherein the predetermined region of the at least one light-transmitting layer is in a hollow structure, and the at least one lens is assembled in the hollow structure.

14. The electronic device of claim 9, wherein the predetermined region of the at least one light-transmitting layer is in an integrated light-transmitting structure of the at least one light-transmitting layer, and the at least one lens is formed by the light-transmitting structure.

15. The electronic device of claim 9, wherein the display component further comprises a display layer, and a light-transmitting portion is provided at a position of the display layer corresponding to the predetermined region, to allow light to pass through the light-transmitting portion to reach the image processor.

16. The electronic device of claim 9, wherein the display component further comprises a display layer, a function display portion is provided at a position of the display layer corresponding to the predetermined region, the function display portion is controllable to be selectively in a display state and a light-transmitting state, wherein when the function display portion is in the display state, the display component has a complete display effect, and when the function display portion is in the light-transmitting state, light passes through the function display portion to reach the image processor.

17. The electronic device of claim 9, wherein the display component further comprises a circuit board, the circuit board comprises a screen control circuit and a camera control circuit, the display component is electrically connected to a motherboard of the device body through the screen control circuit, and the camera component is electrically connected to the motherboard through the camera control circuit.

18. The electronic device of claim 9, wherein the device body comprises at least one screen assembly surface, and the display component covers the at least one screen assembly surface.

* * * * *